United States Patent
Mordukhovich et al.

(10) Patent No.: US 8,563,485 B2
(45) Date of Patent: Oct. 22, 2013

(54) TRIBO-SYSTEM AND METHOD FOR REDUCING PARTICLE CONGLOMERATION THEREIN

(75) Inventors: Gregory Mordukhovich, Bloomfield Hills, MI (US); Jacob N. Israelachvili, Santa Barbara, CA (US)

(73) Assignees: GM Global Technology Operations LLC, Detroit, MI (US); The Regents of The University of California, Oakland, CA (US)

( * ) Notice: Subject to any disclaimer, the term of this patent is extended or adjusted under 35 U.S.C. 154(b) by 551 days.

(21) Appl. No.: 12/784,463

(22) Filed: May 20, 2010

(65) Prior Publication Data

US 2011/0287987 A1 Nov. 24, 2011

(51) Int. Cl.
*F16C 33/12* (2006.01)
*F16C 33/06* (2006.01)

(52) U.S. Cl.
USPC ............ 508/103; 508/107; 428/403; 428/545

(58) Field of Classification Search
USPC ............ 508/103, 110; 428/403, 545; 423/324
See application file for complete search history.

(56) References Cited

U.S. PATENT DOCUMENTS

| | | |
|---|---|---|
| 2004/0150140 A1 | 8/2004 | Zhan et al. |
| 2007/0215841 A1 | 9/2007 | Ford et al. |
| 2008/0093577 A1 | 4/2008 | Khraishi et al. |
| 2009/0008712 A1 | 1/2009 | Choi et al. |
| 2009/0114883 A1 | 5/2009 | Collier et al. |
| 2009/0175757 A1 | 7/2009 | Yao et al. |
| 2010/0004147 A1 * | 1/2010 | Mizrahi .................. 508/103 |

OTHER PUBLICATIONS

Akbulut, Mustafa, et al., "Frictional Properties of Confined Nanorods", Advanced Materials, 2006, 18, pp. 2589-2592.
Akbulut, Mustafa, et al., "Forces between Surfaces across Nanoparticle Solutions: Role of Size, Shape, and Concentration", Langmuir, 2007, vol. 23, No. 7, pp. 3961-3969.
Min, Younjin, et al., "The role of interparticle and external forces in nanoparticle assembly", Nature Materials, Jul. 2008, vol. 7, pp. 527-538.
Godfrey, Anna R., et al., "Forces between Surfactant-Coated ZnS Nanoparticles in Dodecane: Effect of Water", Advanced Functional Materials, 2006, 16, pp. 2127-2134.
Min, Younjin, et al.,"Normal and Shear Forces Generated during the Ordering (Directed Assembly) of Confined Straight and Curved Nanowires", Nano Ltrs, 2008,vol. 8,No. 1, 246-252.
Tian, Yu, et al., "Transient filamentous network structure of a colloidal suspension excited by stepwise electric fields", Physical Review E 75, 2007, pp. 011409-1-011409-6.

* cited by examiner

*Primary Examiner* — Ellen McAvoy
*Assistant Examiner* — Vishal Vasisth
(74) *Attorney, Agent, or Firm* — Dierker & Associates, P.C.

(57) ABSTRACT

A tribo-system includes a metal substrate having a surfactant layer chemisorbed to a side thereof, a lubricant established on the metal substrate, and a plurality of nanoparticles dispersed in the lubricant. Each of the nanoparticles includes i) an inorganic core having a predetermined size and shape, and ii) a surfactant shell chemisorbed to a surface of the inorganic core, where the surfactant shell has a predetermined thickness. The adhesive force and energy between the metal substrate surface and the nanoparticles is higher than the adhesive force and energy between individual particles of the nanoparticles.

13 Claims, 2 Drawing Sheets

TRIBO-SYSTEM AND METHOD FOR REDUCING PARTICLE CONGLOMERATION THEREIN

TECHNICAL FIELD

The present disclosure relates generally to tribo-systems and to methods for reducing particle conglomeration in a tribo-system.

BACKGROUND

Lubricants are often used to reduce friction between two surfaces that contact and rub against each other (such as, e.g., between clutch plates in an automotive transmission system). Several lubricants are currently available that suitably reduce friction between contacting surfaces. An example of such a lubricant includes one containing nanoparticles.

SUMMARY

A tribo-system is disclosed herein. The tribo-system includes a metal substrate having a surfactant layer chemisorbed to a surface thereof, a lubricant established on the metal substrate, and a plurality of nanoparticles dispersed in the lubricant. Each of the nanoparticles includes i) an inorganic core having a predetermined size and shape, and ii) a surfactant shell chemisorbed to a surface of the inorganic core, where the surfactant shell has a predetermined thickness. The adhesive force and energy between the metal substrate surface and the nanoparticles is higher than the adhesive force and energy between individual particles of the nanoparticles.

Also disclosed herein is a method for reducing particle conglomeration in a tribo-system.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the tribo-system, as disclosed herein, generally include a lubricant disposed on a surface, where such lubricant has nanoparticles dispersed therein. The nanoparticles are configured in a manner sufficient to increase the interaction between the nanoparticles and the surface upon which the nanoparticles are disposed (referred to as particle-to-surface interaction). Such an increase in particle-to-surface interaction tends to induce more of a rolling-type behavior (e.g., either i) a pure rolling state, or ii) a combination of rolling and sliding, where more rolling occurs than sliding) of the nanoparticles at least against that surface. Without being bound to any theory, it is believed that such rolling-type behavior advantageously reduces the rate of wear of the nanoparticles, which thereby increases their durability and their effectiveness as a lubricant.

Furthermore, increasing the particle-to-surface interaction tends to overcome inter-particle interaction (i.e., interaction between adjacent nanoparticles). It is believed that the increased particle-to-surface interaction also advantageously reduces an uneven distribution of the nanoparticles disposed on the surface. This may be true, at least in part, because Van der Waals forces and/or energy between nanoparticle cores and the surface upon which they are applied are/is greater than the Van der Waals forces and/or energy between cores of adjacent nanoparticles.

Examples of the tribo-system will now be described in conjunction with FIGS. 1 and 2. These examples may be useful for achieving, e.g., smooth shifting, slipping, and/or the like between two contacting surfaces. For purposes of illustration, the tribo-system will be described hereinbelow for automotive transmission systems, an example of which includes clutch plates that move and rub against each other. It is to be understood, however, that the tribo-system may also be used in a variety of other applications, non-limiting examples of which include power generating and transfer devices for automotive, industrial and/or aerospace applications; medical applications, such as for artificial implants (e.g., knee joints, ankle joints, hip joints, etc.); and in military applications/systems, such as tanks.

Figure 1:
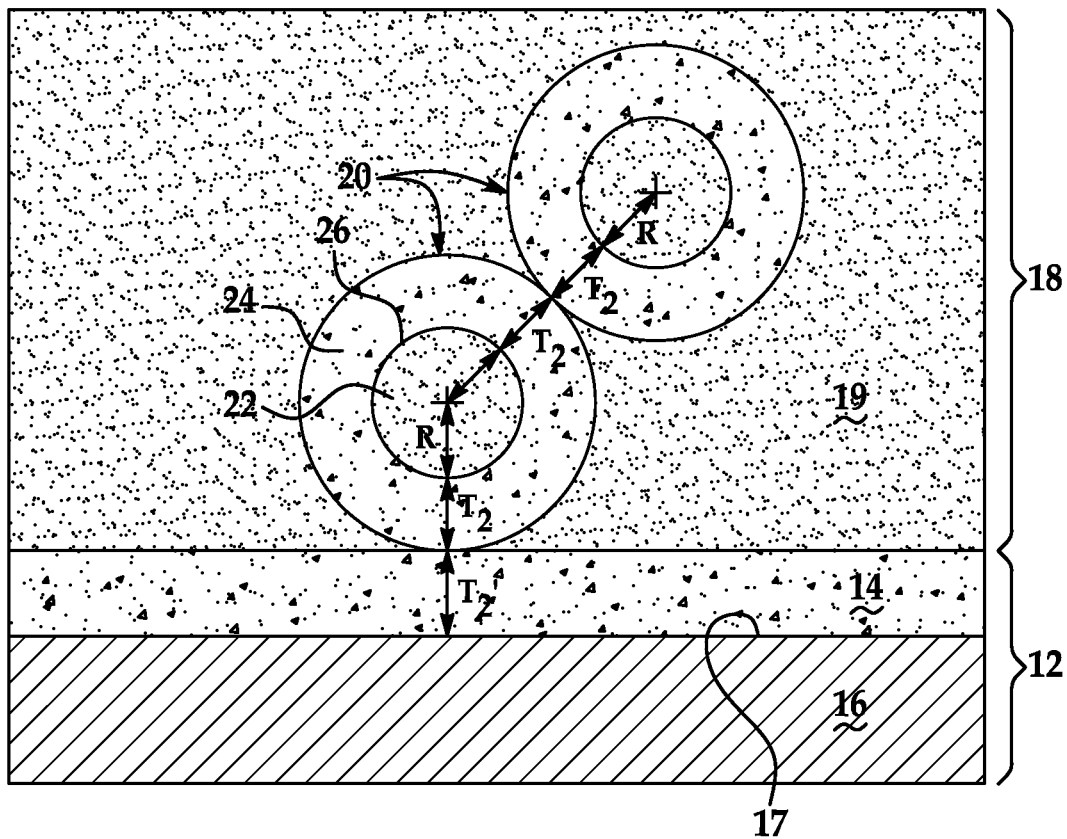
FIG. 1 schematically depicts an example of a tribo-system including a lubricant containing nanoparticles disposed on a surface.
Figure 2:
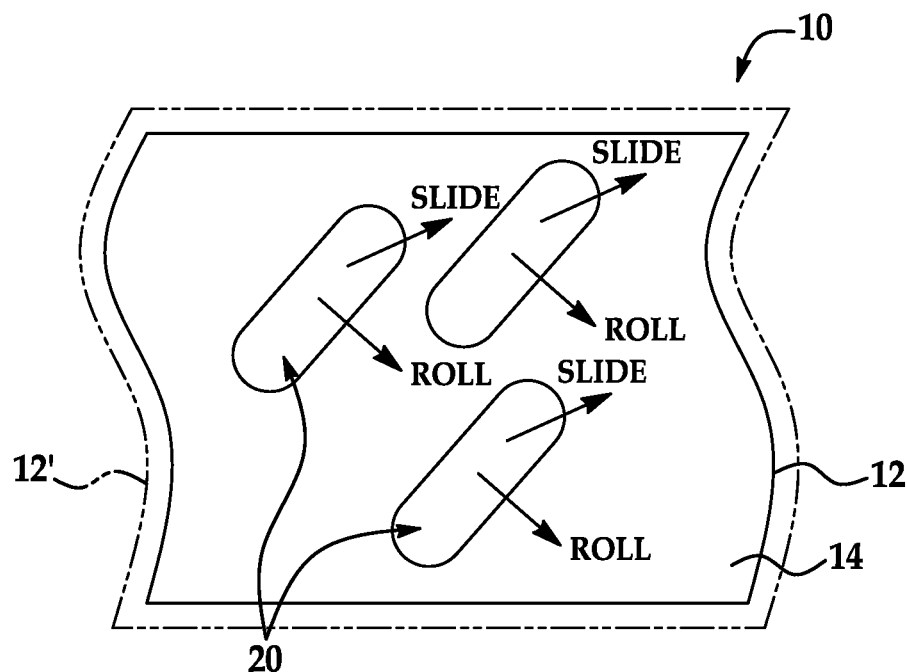
FIG. 2 schematically depicts the tribo-system of FIG. 1 in contact with another surface, and further illustrates the orientation of the nanoparticles in response to a force applied thereto as the two surfaces contact and rub against each other.

Referring now to FIGS. 1 and 2, the tribo-system (identified by reference numeral 10 in the figures) generally includes a surface 12 upon which a lubricant 18 is disposed. The surface 12 may be selected from any surface that may come into contact with and move relative to another surface (such as the surface 12' shown in FIG. 2). Some examples of the surface 12, 12' include, but are not limited to, transmission clutch plates, gears, drive shafts, other rotating shafts, sliding contacts, pistons in an engine, and/or the like. In an example, the surface 12 may be selected from one transmission clutch plate, and the other surface 12' may be selected from an adjacent transmission clutch plate. In this example, the clutch plates may contact and move relative to each other when the vehicle transmission is operating.

In an example, the surface 12 (and in some cases the other surface 12') includes a substrate 16 having a surfactant layer 14 chemisorbed to a side 17 thereof. In an embodiment, the substrate 16 has the surfactant layer 14 covering the entire surface. In an example, the substrate 16 is selected from a metal, non-limiting examples of which include copper, aluminum, magnesium, titanium, iron, alloys of these metals, steel, and/or combinations thereof. The surfactant layer 14 may be formed from a surfactant including silanes, non-conductive carbon-based surfactants, non-conductive phosphorus-based surfactants, polymers, hydrocarbons, fluorocarbons, or combinations thereof.

The lubricant 18 may be disposed on one of the surfaces 12, 12' (more specifically, on the surfactant layer 14) in the form of a continuous layer, where such layer covers the entire surface area of the surface 12. It is to be understood that the lubricant 18 may otherwise be disposed on portions of the surface 12, thereby forming a discontinuous layer. In some cases, the lubricant 18 may be disposed on both of the surfaces 12, 12'. In any event, the lubricant 18 may be disposed on the surface 12 and/or the surface 12' prior to the surfaces 12, 12' contacting each other. Further, although the lubricant 18 may be disposed on the surface 12, 12' in several layers, it is generally desirable to form a single layer (i.e., a monolayer) because the nanoparticles may be more readily controlled. As such, the amount of the lubricant 18 to be applied depends, at least in part, on the surface area to be covered.

As shown in FIG. 1, the lubricant 18 may be a liquid-based system having a plurality of nanoparticles 20 dispersed in a liquid-based medium 19. In an example, the lubricant 18 is a water-based system. In another example, the lubricant 18 is a non-polar liquid-based system. Some non-limiting examples of suitable non-polar liquids for the lubricant 18 include oils (such as hydrocarbons), silanes, fluorocarbons, or combinations thereof. In some instances, the liquid-based system is a non-polar liquid having polar additives therein.

In another example, the lubricant 18 may be a solid-based system including a plurality of dry nanoparticles 20. In some cases, the dry nanoparticles 20 may be mixed with other solid-based lubricants.

The nanoparticles 20 dispersed or mixed in the lubricant 18 may be selected from any nanostructure that is able to rotate in a substantially linear direction with respect to the surface 12, 12' in response to a force applied to the particles (such as when the surface 12 moves against the nanoparticles 20 disposed on the surface 12'). More specifically, when the surface 12 contacts and moves relative to the other surface 12', if moved properly, the nanoparticles 20 tend to roll (as opposed to slide) along the surfaces 12, 12'. Some non-limiting examples of such nanoparticles 20 include those that have a spherical/substantially spherical shape (i.e., the radius is consistent throughout, or includes multiple radii due, at least in part, to the crystalline structure of the nanoparticles), those that have a cylindrical/substantially cylindrical shape (i.e., the diameter is consistent and the length is longer than the diameter, such as shown in FIG. 2, for example), and/or combinations thereof.

As also shown in FIG. 1, the nanoparticles 20 include a nanoparticle core 22 having a shell 24 chemisorbed to a surface 26 of the core 22. In an example, the core 22 is formed from an inorganic material such as, for example, amorphous silica or ceramics.

The nanoparticle shell 24 generally encapsulates the nanoparticle core 22. Since the nanoparticles 20 are being used in or with a lubricant 18, the nanoparticle shell 24 should be formed from a material that exhibits low adhesiveness to the surfaces 12, 12'. Such low adhesiveness, for example, allows the nanoparticles 20 to slip (i.e., slide, but with reduced friction) relative to the motion of the surfaces 12, 12'. This generally reduces frictional losses related to micro-slipping based on the Hertzian contact and macro-slipping in instances where the angle between the rolling axis of the nanoparticle 12 and the motion vector of the surface 12 in the frictional pair deviates from 90°. In other words, the nanoparticle shell 24 is selected from a material that prevents chemical bonding of the nanoparticles 20 to the surface 12, 12'. In an example, the material selected for the nanoparticle shell 24 exhibits an adhesiveness ranging from about 3 kT to about 20 kT of adhesive energy per inter-particle interaction. In another example, the nanoparticle shell 24 is formed from a surfactant, some non-limiting examples of which include silanes, hydrocarbons, non-conductive carbon based surfactants, non-conductive phosphorus based surfactants, and combinations thereof.

The nanoparticles 12 may be commercially available, or such particles 12 may be produced using any suitable method known in the art.

In an example, the size (e.g., diameter of a sphere or cylinder, length of a cylinder, etc.) of the nanoparticles 20 (i.e., the core 22 and the shell 24 together) ranges from about 0.1 micron to about 100 microns. It is to be understood, however, that the size of the nanoparticles 20 depends, at least in part, on the surface roughness, and such particles 20 may thus have a size range falling anywhere within the range recited above.

The nanoparticles 20 may be dispersed in the liquid-based medium by adding the nanoparticles 20 to the medium and stirring. Some non-limiting examples of solvents/media that the nanoparticles 20 may be dispersed in include water, hydrocarbons, and the like.

In an example, the lubricant 18 is disposed on the surface 12, 12' using any suitable deposition process known in the art.

To reiterate from above, the configuration of the nanoparticles 20 dispersed in the lubricant 18 may be controlled in order to control the interaction between the nanoparticles 20 and the surface 12, 12' upon which the lubricant 18 is disposed. Upon increasing the particle-to-surface interaction, a more rolling-type behavior of the nanoparticles 20 against the surface 12, 12' may be achieved. It is to be understood that when the nanoparticles 20 are in a pure rolling state (i.e., the nanoparticles 20 roll relative to the moving surface in one direction), such particles 20 do not undergo any sliding (except micro-sliding that may be due to Hertzian load); and when the nanoparticles 20 are in a pure sliding state (i.e., the nanoparticles 20 slide relative to the moving surface in another direction), the nanoparticles 20 do not undergo any rolling. Both a pure rolling state and a pure sliding state of the nanoparticles 20 are depicted in FIG. 2 (via the arrows respectively labeled "ROLL" and "SLIDE"). Such pure states may be individually achieved by applying a particular force to the nanoparticles 20, where such particles 20 have a predefined configuration.

Without being bound to any theory, it is believed that a more rolling state (as opposed to a more sliding state) may be achieved by optimizing the configuration of the nanoparticles 20 for a particular tribo-system. More specifically, knowing that physical and chemical properties of the nanoparticles 20 tend to differ from those of their bulk material(s), it is believed that the nanoparticles 20 will exhibit relatively unique physical and chemical properties based, at least in part, on their configuration. Such would include, for example, the shape of the nanoparticles 20, the size of the nanoparticles 20, the refractive index of the nanoparticle core 22, the chemical structure of the nanoparticle core 22 (such as if the core 22 is amorphous or crystalline), the chemistry of the nanoparticle shell 24, the thickness of the nanoparticle shell 24, the refractive index of the nanoparticle shell 24, and/or combinations thereof. In some instances, the topography and/or the operating conditions may also be factors in inducing a rolling state of the nanoparticles 20 against the surface 12, 12'. Accordingly, when used in a lubricant, at least changes in the configuration of the nanoparticles 20 may, in some instances, affect their tribological behavior. As such, at least the configuration of the nanoparticles 20 may be specifically selected for optimum performance in the tribo-system in which the nanoparticles 20 are to be used.

The particle-to-particle interaction may be determined by estimating the adhesive energy and force between adjacent nanoparticles 20. Such may be accomplished, for example, by approximating the Hamaker's constant A for interaction between the nanoparticles 20, and then determining the adhesive energy $E_{P-P}$ between the nanoparticles 20 also based on the approximated Hamaker's constant. Likewise, the particle-to-surface interaction may be determined by estimating the adhesive energy between the nanoparticles 20 and the surface 12, 12'. Determining the adhesive energy $E_{P-S}$ between the nanoparticles 20 and the surface 12, 12' may also be accomplished based on the Hamaker's constant A (assuming the surfactant on the surface 12, 12' and on the nanoparticles 20 is the same) or via a modified version of Hamaker's constant A' (shown below). In an example, to achieve the desired rolling-type behavior, the adhesive energy between the nanoparticles 20 and the surface 12, 12' is 3 or more times higher than the adhesive energy between individual nanoparticles 20.

Hamaker's constant A for interaction between individual nanoparticles 20 may be approximated using Equation (1):

$$A \approx \frac{3(n_1^2 - n_2^2)^2 h v_1 v_2}{8\sqrt{2}\,(n_1^2 + n_2^2)^{3/2}(v_1 + v_2)} \approx \frac{3h\bar{v}(n_1^2 - n_2^2)^2}{16\sqrt{2}\,(n_1^2 + n_2^2)^{3/2}} \quad \text{(Equation 1)}$$

where $n_1$ is the refractive index of the nanoparticles 20, $n_2$ is the refractive index of the lubricant 18, h is the Planck constant, $v_1$ is the electronic absorption frequency ($s^{-1}$) of the nanoparticles 20, and $v_2$ is the electronic absorption frequency ($s^{-1}$) of the lubricant 18.

Hamaker's constant A may then be used to determine the adhesive energy between adjacent nanoparticles 20 $E_{P-P}$ using Equation (2):

$$E_{p-p} = -AR/12(2T_2) \quad \text{(Equation 2)}$$

where A is Hamaker's constant for interaction between nanoparticles 20, R is the predetermined radius (in nanometers) of each individual nanoparticle 20, and $T_2$ is the predetermined thickness (in nanometers) of the surfactant shell 24.

Hamaker's constant A may also be used to determine the adhesive energy between the nanoparticles 20 and the surface 12, 12' $E_{P-S}$ using Equation (3):

$$E_{p-s} = -A'R/6(T_2+T_2') \quad \text{(Equation 3)}$$

where A' is a modified Hamaker's constant for interaction between nanoparticles 20, R is the predetermined radius (in nanometers) of each individual nanoparticle 20, $T_2$ is the predetermined thickness (in nanometers) of the surfactant shell 24, and $T_2'$ is the thickness of the surfactant layer 14 chemisorbed to the substrate 16. The modified Hamaker's constant A' for nanoparticle-substrate interaction is shown in Equation 4:

$$A' \approx \frac{3h}{8\sqrt{2}} \frac{(n_1^2 - n_2^2)^2 h v_1 v_3}{(n_1^2 + n_2^2)^{1/2}[v_1 + (n_1^2 + n_2^2)^{1/2} v_3]} \approx \quad \text{(Equation 4)}$$

$$\frac{3h\bar{v}}{8\sqrt{2}} \frac{(n_1^2 - n_2^2)}{(n_1^2 + n_2^2)^{1/2}[1 + (n_1^2 + n_2^2)^{1/2}]}$$

wherein $n_1$ is the refractive index of the nanoparticles core, $n_2$ is the refractive index of the lubricant, $n_3$ is the refractive index of the substrate, h is Planck's constant, $v_1$ is an electronic absorption frequency of the inorganic core, and $v_2$ is an electronic absorption frequency of the lubricant, and $v_3$ is an electronic absorption frequency of the substrate.

Without being bound to any theory, it is further believed that the increased adhesive energy between the nanoparticles 20 and the surface 12, 12' $E_{P-S}$ also increases Van der Waals forces between the nanoparticles 20 and the surface 12, 12'. In an example, a ratio of the Van der Waals forces between the cores of the individual nanoparticles 20 to the Van der Waals forces between the nanoparticles 20 and the surface 12, 12' upon which the particles 20 are disposed is equal to or greater than about 1:3.

Figure 3:
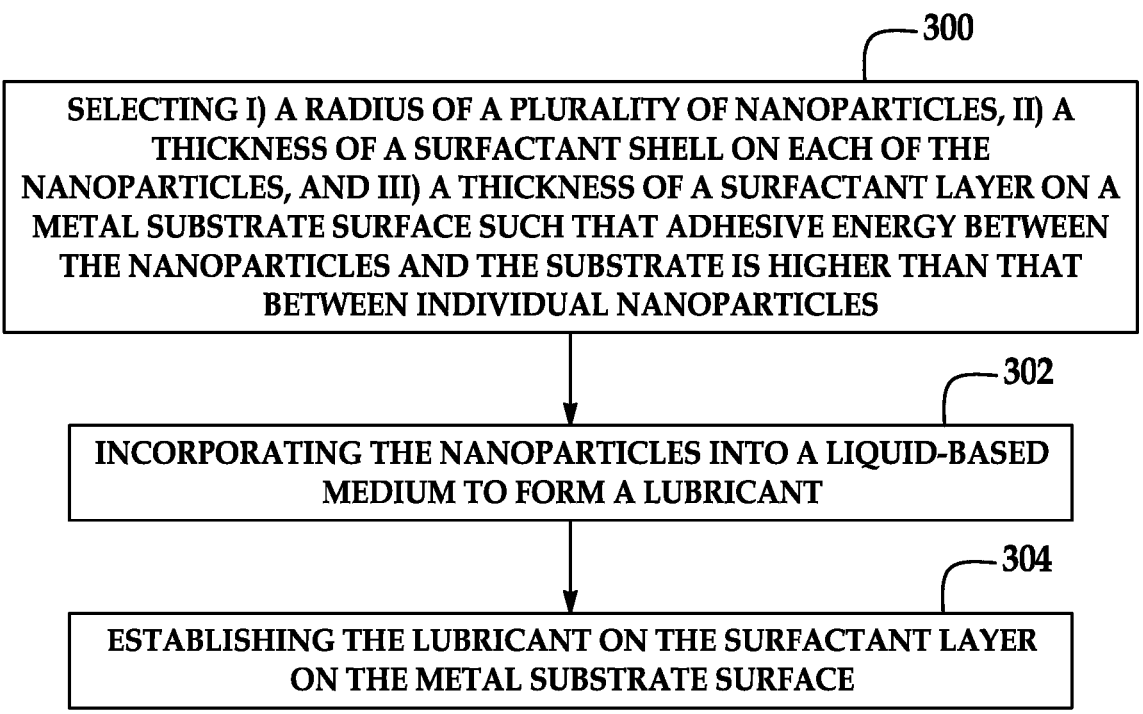
FIG. 3 is a flow diagram depicting an example of a method for controlling particle-to-particle interaction in a tribo-system.

Also disclosed herein is a method for decreasing particle-to-particle attraction in a tribo-system (such as the tribo-system 10). As shown in FIG. 3, the method includes selecting i) a radius of the nanoparticles 20, ii) a thickness of the nanoparticle shell 24, and iii) the thickness of the surfactant layer 14 chemisorbed to the substrate 16 of the surface 12 such that adhesive energy between the surface 12 and the nanoparticles 20 is higher than that between individual nanoparticles 20 (as shown by reference numeral 300). Then the nanoparticles 20 are incorporated into a liquid-based medium to form a lubricant 18 (as shown by reference numeral 302).

The lubricant 18 is thereafter established on the surfactant layer 14 that is chemisorbed to the substrate 16 of the surface 12 (as shown by reference numeral 304). The lubricant 18 may be deposited via any suitable technique, including, but not limited to, spraying, mechanical distribution, spreading, or the like.

To further illustrate the example(s) of the present disclosure, the following example is given herein. It is to be understood that this example is provided for illustrative purposes and is not to be construed as limiting the scope of the disclosure.

EXAMPLE

Three types of nanoparticles were the subject of a simulated example in which the Hamaker constant A and the adhesive energies were calculated. For this example, it was assumed that the surfactant on the nanoparticle surface was the same as the surfactant on a surface of a metal substrate (upon which the nanoparticle containing lubricant would be disposed), and as such, the Hamaker constant A was used to calculate both particle-to-particle interaction and particle-to-surface interaction. The first type of nanoparticle included a nanoparticle core formed from silica having a radius (R) of 2 nm and a refractive index (n1) of 1.45. The second type of nanoparticle included a nanoparticle core formed from alumina having a radius (R) of 2 nm and a refractive index (n1) of 1.75. The third type of nanoparticle included a nanoparticle core formed from silica having a radius (R) of 50 nm and a refractive index (n1) of 1.45. The Hamaker constant A for each of these nanoparticles was determined for lubricants prepared with an oil-based medium (i.e., the surfactant). From the Hamaker constant A, the adhesion energy (measured in Joules) for particle-to-particle interaction and particle-to-surface interaction was determined for each of the nanoparticle types. The calculated Hamaker constants A and the calculated adhesion energies are summarized in Table 1.

TABLE 1

| | Hamaker constants, for interactions in oil, n2 = 1.41 | | Adhesion energies in kT units (1 kT = 4.2 × 10$^{-21}$ J) | |
|---|---|---|---|---|
| | Particle - particle | Particle - surface | Particle - particle | Particle - surface |
| Silica (SiO2) R = 2 nm core, n1 = 1.45 | 0.6 × 10$^{-21}$ J | 6.5 × 10$^{-21}$ J | 0.01 | 0.2 (x20) |
| Alumina (Al2O3) R = 2 nm core, n1 = 1.75 | 30 × 10$^{-21}$ J | 46 × 10$^{-21}$ J | 0.40 | 1.2 (x3) |
| Silica (SiO2) R = 50 nm core, n1 = 1.45 | 0.6 × 10$^{-21}$ J | 6.5 × 10$^{-21}$ J | 0.25 | 5.0 (x20) |

*The data provided in Table 1 was determined using a surface having a surfactant layer thickness T$_2$' of 1.5 nm, and nanoparticles having a shell thickness T$_2$ of 1.5 nm.

As shown in Table 1, the nanoparticle type including the silica nanoparticle core having a radius of 50 nm and a refractive index of 1.45 (i.e., the third type) achieves a much higher adhesive energy (i.e., 5.0×10$^{20}$ kT) for the particle-to-surface interaction than for the particle-to-particle interaction. Such higher adhesive energy infers that the Van der Waals attraction between the nanoparticles and the surface upon which the nanoparticles are disposed (in the form of a lubricant) is much higher than between individual nanoparticles.

While several embodiments have been described in detail, it will be apparent to those skilled in the art that the disclosed embodiments may be modified. Therefore, the foregoing description is to be considered exemplary rather than limiting.

The invention claimed is:

1. A tribo-system, comprising:
   a metal substrate;
   a surfactant layer chemisorbed to and covering a surface of the metal substrate;
   a lubricant established on the metal substrate; and
   a plurality of nanoparticles dispersed in the lubricant, each of the plurality of nanoparticles including:
      an inorganic core having a predetermined size and shape; and
      a surfactant shell chemisorbed to a surface of the inorganic core, the surfactant shell having a predetermined thickness and being separate from the surfactant layer that is chemisorbed to the metal substrate surface;
   wherein adhesive force and energy between the metal substrate surface and the plurality of nanoparticles is higher than adhesive force and energy between individual particles of the plurality of nanoparticles.

2. The tribo-system as defined in claim 1 wherein the inorganic core is an amorphous silica particle or a ceramic.

3. The tribo-system as defined in claim 1 wherein the surfactant shell is a silane, a hydrocarbon, a non-conductive carbon based surfactant, or a non-conductive phorphorus based surfactant.

4. The tribo-system as defined in claim 1 wherein a ratio of van der Waals forces between the individual particles of the plurality of nanoparticles to van der Waals forces between the metal substrate surface and the plurality of nanoparticles is equal to or greater than 1:3.

5. The tribo-system as defined in claim 1 wherein the lubricant is a water-based system or a non-polar liquid-based system.

6. The tribo-system as defined in claim 1 wherein Hamaker's constant (A) for interaction between nanoparticles is approximated by:

$$A \approx \frac{3(n_1^2 - n_2^2)^2 h v_1 v_2}{8\sqrt{2} (n_1^2 + n_2^2)^{3/2} (v_1 + v_2)}$$

wherein $n_1$ is the refractive index of the nanoparticles, $n_2$ is the refractive index of the lubricant, h is Planck's constant, $v_1$ is an electronic absorption frequency of the nanoparticles, and $v_2$ is an electronic absorption frequency of the lubricant.

7. The tribo-system as defined in claim 6 wherein an adhesive energy $E_{p-p}$ between individual particles of the plurality of nanoparticles is determined by:

$$E_{p-p} = -AR/12(2T_2)$$

wherein A is Hamaker's constant for interaction between nanoparticles, R is the predetermined radius of each individual nanoparticle, and $T_2$ is the predetermined thickness of the surfactant shell.

8. The tribo-system as defined in claim 1 wherein adhesive energy $E_{p-s}$ between the plurality of nanoparticles and the metal substrate surface is determined by:

$$E_{p-s} = -A'R/6(T_2+T_2')$$

wherein R is a predetermined radius of each individual nanoparticle, $T_2$ is the predetermined thickness of the surfactant shell, and $T_2'$ is the thickness of the surfactant layer chemisorbed to the metal substrate surface, and A' is a modified Hamaker's constant for nanoparticle-substrate interaction:

$$A' \approx \frac{3h}{8\sqrt{2}} \frac{(n_1^2 - n_2^2)^2 h v_1 v_3}{(n_1^2 + n_2^2)^{1/2} [v_1 + (n_1^2 + n_2^2)^{1/2} v_3]}$$

wherein $n_1$ is the refractive index of the inorganic core, $n_2$ is the refractive index of the lubricant, $n_3$ is the refractive index of the substrate, h is Planck's constant, $v_1$ is an electronic absorption frequency of the inorganic core, and $v_2$ is an electronic absorption frequency of the lubricant, and $v_3$ is an electronic absorption frequency of the substrate.

9. The tribo-system as defined in claim 1 wherein the adhesive energy between the metal substrate surface and the plurality of nanoparticles is such that the plurality of nanoparticles at least one of i) roll, or ii) roll and slide along the metal substrate surface.

10. The tribo-system as defined in claim 1 wherein the surfactant shell prevents chemical bonding of the plurality of nanoparticles to the metal substrate surface.

11. The tribo-system as defined in claim 1 wherein the nanoparticles are spherical and wherein a diameter of the nanoparticles range from about 0.1 microns to about 100 microns.

12. The tribo-system as defined in claim 1 wherein:
the inorganic core is a silica core having a radius of 50 nm and a refractive index of 1.45;
the surfactant shell predetermined thickness is 1.5 nm; and
a thickness of the surfactant layer chemisorbed to and covering the metal substrate surface is 1.5 nm.

13. The tribo-system as defined in claim 1 wherein the metal substrate is selected from the group consisting of copper, aluminum, magnesium, titanium, iron, alloys of these metals, steel, and combinations thereof.

* * * * *